(12) United States Patent
Kodama

(10) Patent No.: US 9,066,105 B2
(45) Date of Patent: Jun. 23, 2015

(54) IMAGE PROCESSING DEVICE, IMAGE PROCESSING SYSTEM AND METHOD FOR HAVING COMPUTER PERFORM IMAGE PROCESSING BASED ON SUB-BLOCK CODING UNIT

(75) Inventor: Sho Kodama, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 414 days.

(21) Appl. No.: 13/329,006

(22) Filed: Dec. 16, 2011

(65) Prior Publication Data

US 2013/0077881 A1   Mar. 28, 2013

(30) Foreign Application Priority Data

Sep. 26, 2011   (JP) ................................. 2011-209614

(51) Int. Cl.
*G06K 9/36* (2006.01)
*H04N 19/423* (2014.01)
*H04N 19/176* (2014.01)
*H04N 19/46* (2014.01)

(52) U.S. Cl.
CPC ........... *H04N 19/423* (2014.11); *H04N 19/176* (2014.11); *H04N 19/46* (2014.11)

(58) Field of Classification Search
None
See application file for complete search history.

(56) References Cited

U.S. PATENT DOCUMENTS 5,086,497 A * 2/1992 Horikawa et al. ............. 715/209
5,253,055 A * 10/1993 Civanlar et al. .......... 375/240.24
5,379,351 A * 1/1995 Fandrianto et al. ........... 382/236
6,683,910 B1 * 1/2004 Burns et al. .............. 375/240.24
7,142,603 B2 * 11/2006 Luna et al. ................ 375/240.23
8,238,437 B2   8/2012 Hashiguchi et al.
2009/0080531 A1   3/2009 Hashiguchi et al.

FOREIGN PATENT DOCUMENTS

| JP | H10-75345 A | 3/1998 |
|---|---|---|
| JP | 2009-77176 B2 | 4/2009 |
| JP | 2010-74446 A | 4/2010 |

OTHER PUBLICATIONS

Uchiyama, Matsato et al., "A Rate-Controllable Near-Lossless Data Compression IP for HDTV Decoder LSI in 65nm CMOS", Center for Semiconductor Research & Development, Toshiba Semiconductor Company. Solid-State Circuits Conference, Nov. 16-18, 2009, A-SSCC 2009. IEEE Asian.
Japanese Office Action dated Feb. 7, 2014 in Japanese Application No. 2011-209614.

* cited by examiner

*Primary Examiner* — Chan Park
*Assistant Examiner* — Eueng-Nan Yeh
(74) *Attorney, Agent, or Firm* — Knobbe Martens Olson & Bear LLP

(57) ABSTRACT

According to one embodiment, an image processing device includes an encoder, a sub-block selector, an image processor, and a decoder. The encoder generates coded data by encoding an input bit stream of image data including plural blocks in a block unit of a predetermined number. The sub-block selector selects at least one sub-block from the coded data. The sub-block includes a request area on which an image processing is performed, and which is smaller than the block. The decoder decodes the sub-block to generate decoded data. The image processor performs the image processing on the decoded data to generate processed image data.

11 Claims, 8 Drawing Sheets

ADDITIONAL DECODING DATA

OUTPUTTED BIT STREAM

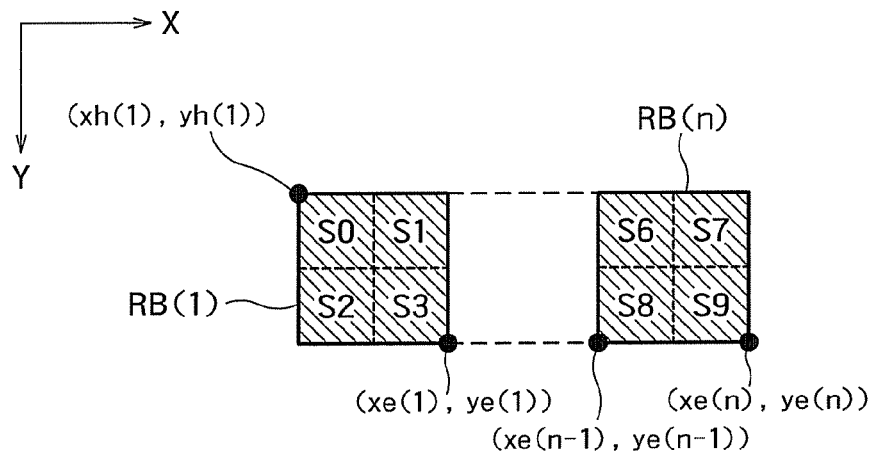
FIG. 11A
ADDITIONAL DECODING DATA
| (xh(1), yh(1)) | AC(n) | DC(n) |
FIG. 11B
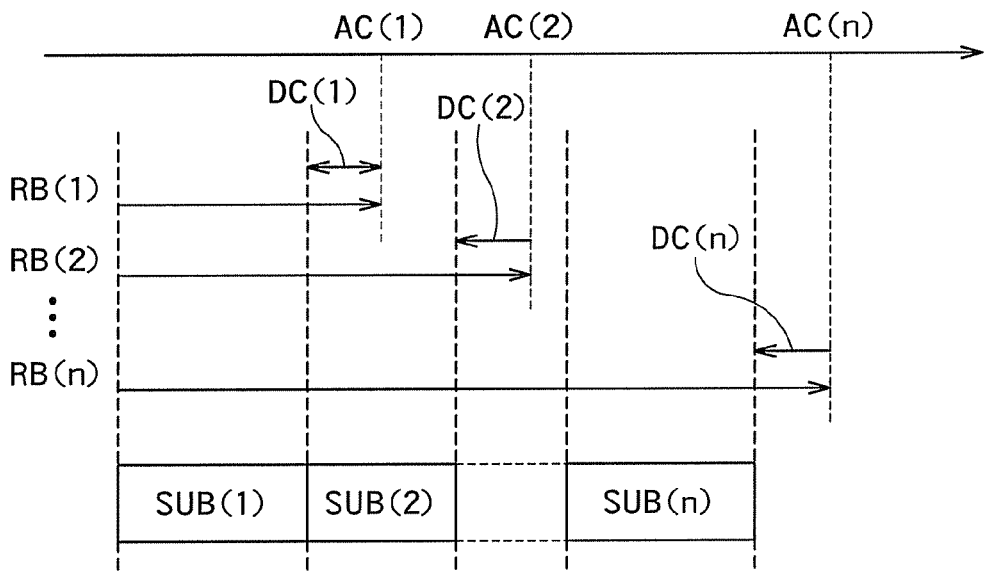
FIG. 11C

IMAGE PROCESSING DEVICE, IMAGE PROCESSING SYSTEM AND METHOD FOR HAVING COMPUTER PERFORM IMAGE PROCESSING BASED ON SUB-BLOCK CODING UNIT

CROSS REFERENCE TO RELATED APPLICATIONS

This application is based upon and claims the benefit of priority from the prior Japanese Patent Application No. 2011-209614, filed on Sep. 26, 2011, the entire contents of which are incorporated herein by reference.

FIELD

Embodiments described herein relate generally to an image processing device, an image processing system, and a method for having a computer processor perform an image processing.

BACKGROUND

A technology of encoding data to be stored in a memory in a predetermined coding unit (for example, a block size unit) is well known in order to reduce a use amount of the memory such as a DRAM (Dynamic Random Access Memory) and a transfer amount of a bus connected to the memory. The coded data encoded by the technology is read from the memory in the same read unit (for example, the block size unit) as the coding unit.

However, the read unit is conventionally the block size unit even if a data size requested by a data processing module that performs data processing is smaller than a block size. Accordingly, utilization efficiency of the bus is decreased in reading the coded data from the memory.

On the other hand, if the read unit becomes smaller than the block size unit, utilization efficiency of the bus is improved. However, it is necessary to make the coding unit smaller for making the read unit smaller than the block size unit. Quality of data obtained by decoding the coded data is degraded if the coding unit size is reduced.

BRIEF DESCRIPTION OF THE DRAWINGS

FIGS. 11A to 11C are schematic diagrams illustrating the additional decoding data of the second modification of the embodiment.

DETAILED DESCRIPTION

Embodiments will now be explained with reference to the accompanying drawings.

In general, according to one embodiment an image processing device includes an encoder, a sub-block selector, an image processor, and a decoder. The encoder generates coded data by encoding an input bit stream of image data including plural blocks in a block unit of a predetermined number. The sub-block selector selects at least one sub-block from the coded data. The sub-block includes a request area on which an image processing is performed, and which is smaller than the block. The decoder decodes the sub-block to generate decoded data. The image processor performs the image processing on the decoded data to generate processed image data.

Figure 1:
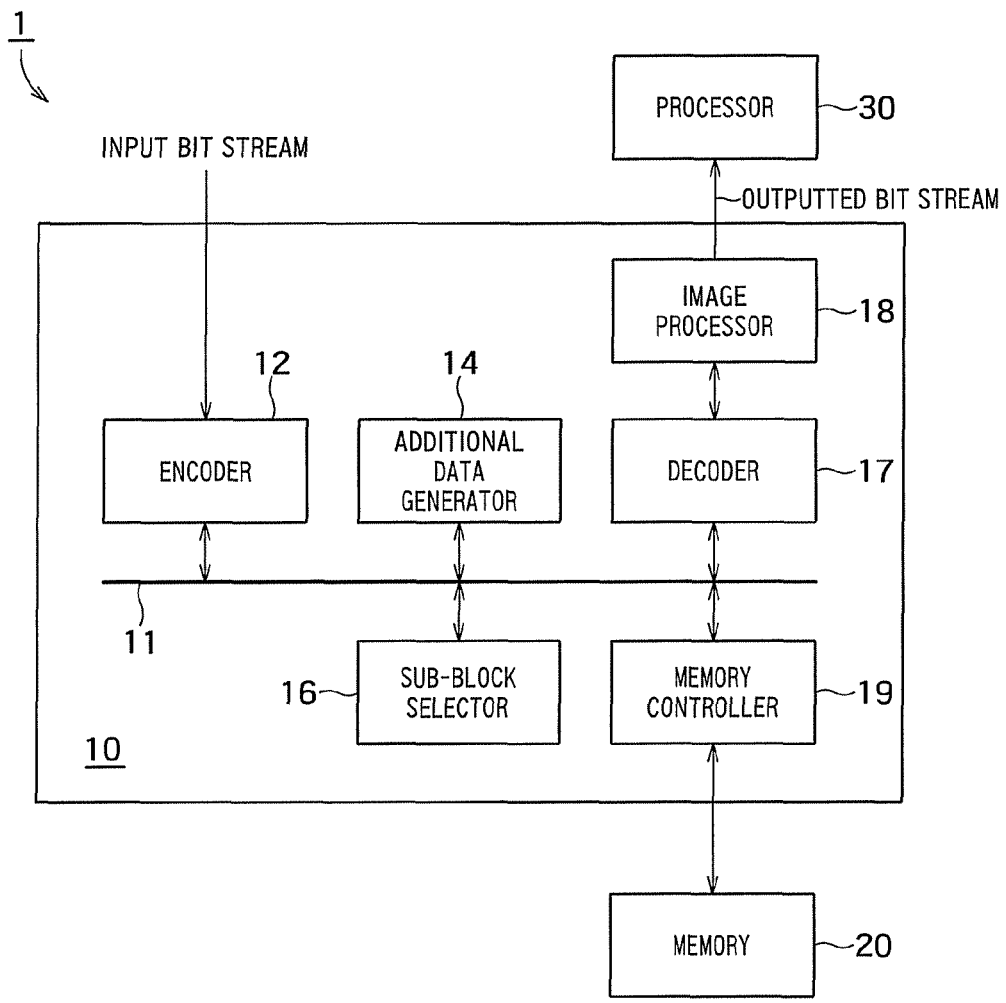
FIG. 1 is a block diagram of the image processing system 1 of the embodiment.

Hereafter, an image processing device and an image processing system according to the embodiment will be described more specifically with reference to the drawings. A configuration of an image processing system 1 according to an embodiment will be described. FIG. 1 is a block diagram of the image processing system 1 of the embodiment. The image processing system 1 of the embodiment includes an image processing device 10, a memory 20, and a processor 30.

The image processing device 10 includes a bus 11, an encoder 12, an additional data generator 14, a sub-block selector 16, an image processor 18, and a memory controller 19. The encoder 12, the additional data generator 14, the sub-block selector 16, the decoder 17, and the memory controller 19 are connected to one another through the bus 11. The image processor 18 is connected to the decoder 17. For example, the encoder 12 is an encoder for YUV format, and the decoder 17 is a decoder for YUV format. For example, image processing performed by the image processor 18 includes intra-frame prediction, quantization, and variable-length coding, based on video codec such as H.264. For example, the memory controller 19 is a DMAC (Direct Memory Access Controller).

The memory 20 is connected to the memory controller 19. Data (data including an input bit stream and an outputted bit stream) dealt with by the image processing device 10 can be stored in the memory 20. For example, the memory 20 is a DRAM.

The processor 30 performs arbitrary processing on the outputted bit stream that is of a processing result of the image processor 18. For example, the processor 30 is a CPU (Central Processing Unit) that converts the outputted bit stream into a format in which the data can be displayed on a liquid crystal display.

Figure 2:
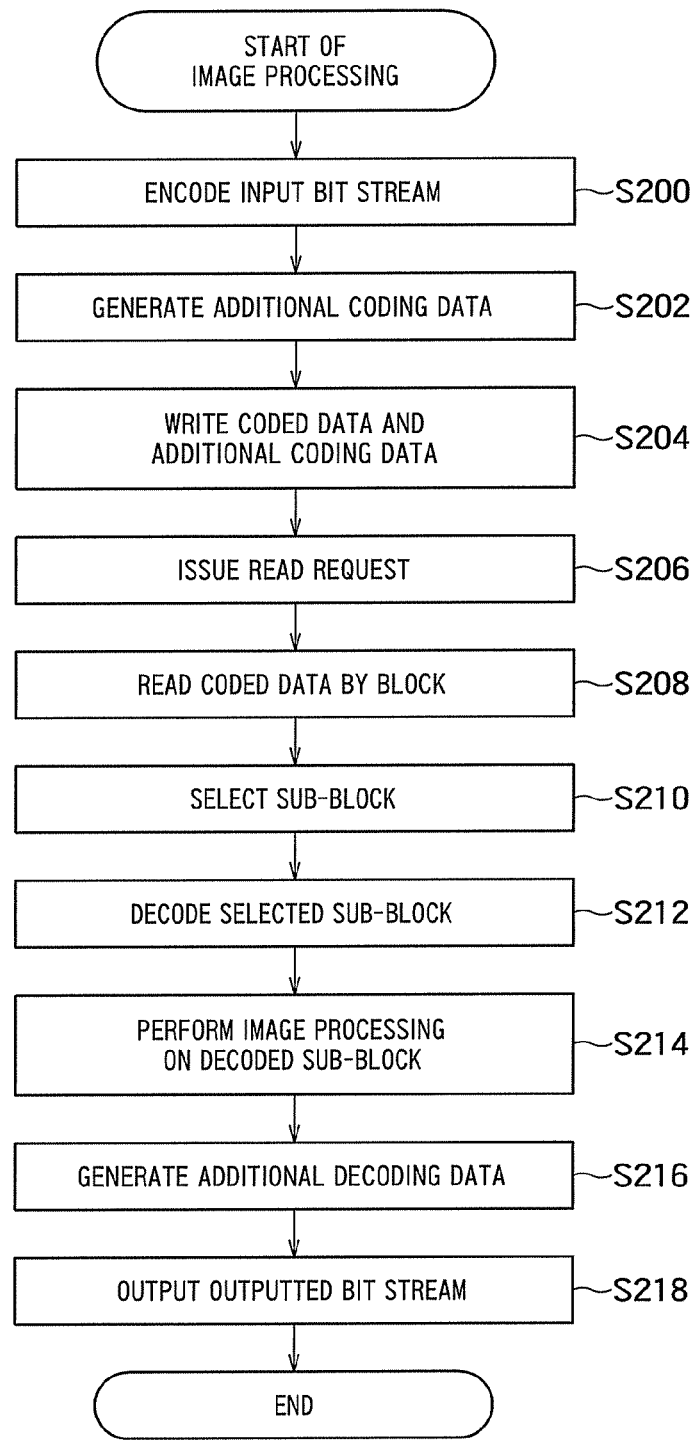
FIG. 2 is a flowchart of the image processing of the embodiment.

An operation of the image processing system 1 of the embodiment will be described below. FIG. 2 is a flowchart of the image processing of the embodiment.

Figure 3:
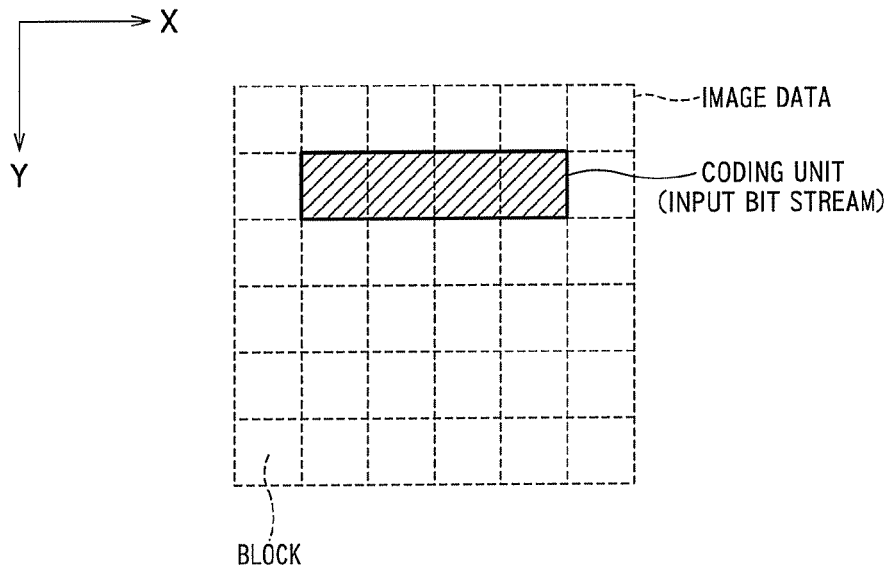
FIG. 3 is a schematic diagram of the image data and the input bit stream of the embodiment.

<S200> The encoder 12 encodes the input bit stream of the image data, supplied from the outside (for example, the processor 30) of the image processing device 10, in a coding unit (predetermined code length) and then the encoder 12 generates coded data by encoding. FIG. 3 is a schematic diagram of the image data and the input bit stream of the embodiment. For example, the image data includes 6×6 (=36) blocks. The coding unit is a block unit of a predetermined number (for example, 4).

<S202> The additional data generator 14 generates additional coding data that indicates a relationship between a block and a sub-block. In the image data, the number of sub-blocks is larger than that of blocks. That is, a size of the sub-block is smaller than that of the block.

Figure 4A:
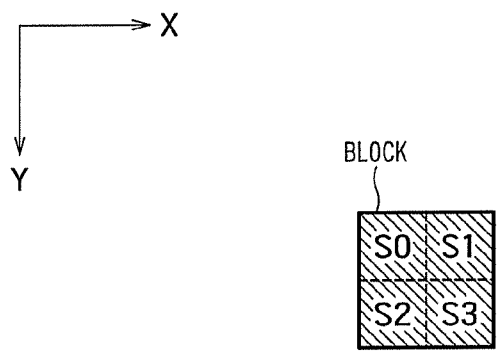
FIGS. 4A are 4B schematic diagrams of the additional coding data of the embodiment.
Figure 4B:
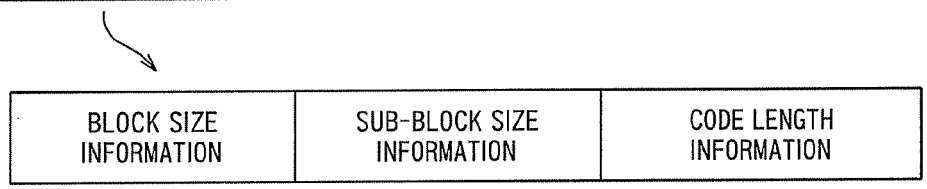

FIGS. 4A and 4B are schematic diagrams of the additional coding data of the embodiment. For example, 1 block has 2×2 (=4) sub-blocks S0 to S3 (see FIG. 4A). The additional coding data includes block size information that indicates the size (hereinafter referred to as a "block size") of the block, sub-block size information that indicates the size (hereinafter referred to as a "sub-block size") of the sub-block, and code length information (see FIG. 4B). The code length information indicates a starting bit position of each sub-block in the bit stream of each block that is generated by the encoder 12 in S200.

<S204> The memory controller 19 writes the coded data and the additional coding data into the memory 20. The coded data and the additional coding data are stored while associated with each other. Therefore, when getting access to the memory 20, the decoder 17 can obtain the coded data and the additional coding data (block size information and sub-block size information), which are associated with each other.

Figure 5:
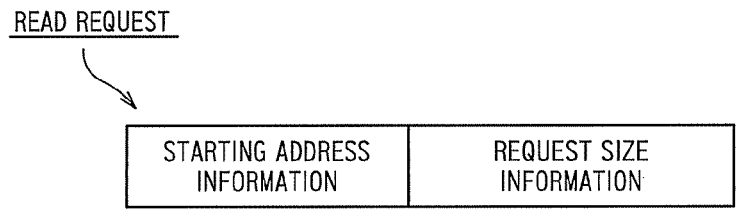
FIG. 5 is a schematic diagram of the read request of the embodiment.

<S206> The image processor 18 issues a read request to read the coded data from the memory 20. FIG. 5 is a schematic diagram of the read request of the embodiment. The read request includes starting address information that indicates a starting address of the memory 20 in which the coded data to be read is stored and request size information that indicates the size (hereinafter referred to as a "request size") of the coded data to be read.

Figure 6:
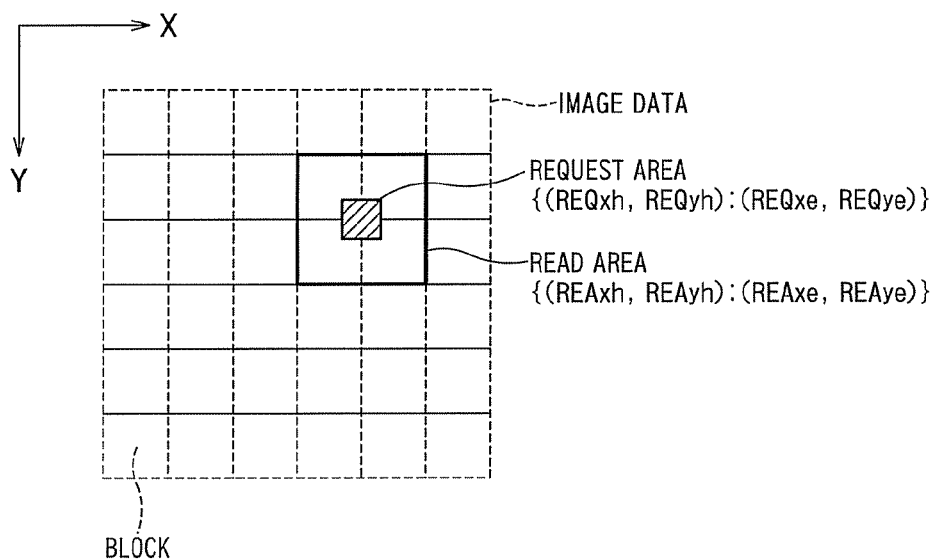
FIG. 6 is a schematic diagram of a request area and a read area of the embodiment.

<S208> The memory controller 19 reads the coded data stored in the memory 20 by the block unit based on the read request. FIG. 6 is a schematic diagram of a request area and a read area of the embodiment.

For example, the memory controller 19 determines a head coordinate (REQxh, REQyh) and an end coordinate (REQxe, REQye) of a request area REQ on which an image processing is performed in a space of the image data based on the starting address information and the request size information in the read request.

Then, in the space of the image data, the memory controller 19 determines a head coordinate (REAxh, REAyh) and an end coordinate (REAxe, REAye) of an area (hereinafter referred to as a "read area") REA of coded data to be read such that the read area REA includes the request area REQ.

Then, based on the additional coding data stored in the memory 20, the memory controller 19 specifies the coded data corresponding to the read area REA, and reads the specified coded data and the additional coding data corresponding to the specified coded data from the memory 20. The memory controller 19 transfers only the coded data corresponding to sub-block Si in the coded data read in S208 to the decoder 17 through the bus 11, so that a data transfer amount on the bus 11 can be reduced to improve the utilization efficiency.

<S210> Based on the block size information and the sub-block size information in the additional coding data and the starting address information and the request size information in the read request, the sub-block selector 16 selects I (I is a natural number) sub-blocks Si (i=1 to I) that include the request area REQ from the coded data read by the memory controller 19. That is, the selected sub-block Si includes at least a part of the request area RED.

Figure 7A:
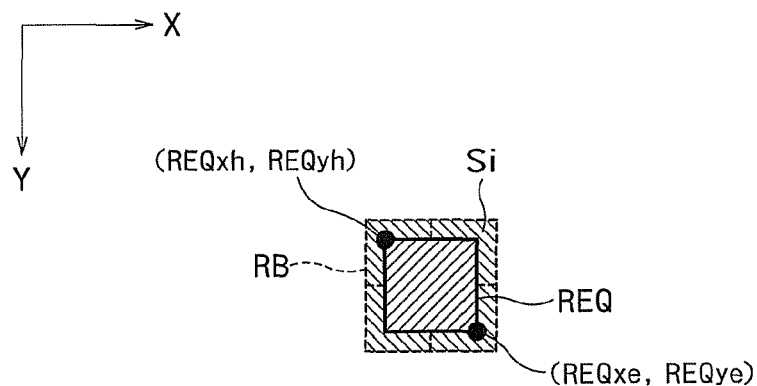
FIGS. 7A to 7C are schematic diagrams of the sub-block of the embodiment.
Figure 7B:
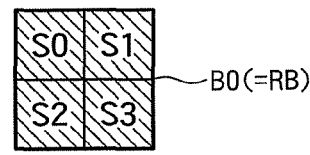
Figure 7C:
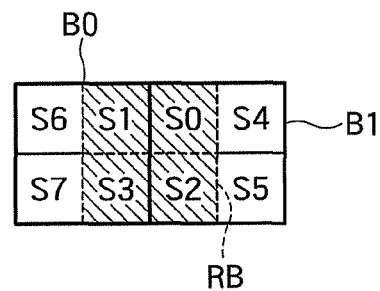

FIGS. 7A to 7C are schematic diagrams of the sub-block of the embodiment. The number of selected sub-blocks Si and positions of the selected sub-blocks Si are determined by the block size, the sub-block size, and the head coordinate (REQxh, REQyh) and the end coordinate (REQxe, REQye) of the request area REQ (see FIG. 7A). The sub-block Si (i=0 to 3) may be selected from 1 block B0 (see FIG. 7B). In this case, the request block RB including the selected sub-block Si is matched with the block B0. On the other hand, the sub-block Si may be selected from the plural blocks B0 and B1 (see FIG. 7C). In this case, the request block RB is not matched with the blocks B0 and B1.

<S212> The decoder 17 decodes the sub-block Si (that is, the request block RB) selected in S210, and generates decoded data. The data to be decoded is only the selected sub-block Si, so that a processing amount of the decoder 17 can be reduced compared with the conventional technology.

<S214> The image processor 18 performs the image processing on the decoded data. The image processor 18 performs the image processing only on the decoded data (that is, the data corresponding to the sub-block Si), so that the processing amount of the image processor 18 can be reduced compared with the conventional technology.

<S216> The additional data generator 14 generates additional decoding data that defines the sub-block (that is, the sub-block selected in S210) Si corresponding to the decoded data. In other words, the additional decoding data defines the request block RB.

Figure 8A:
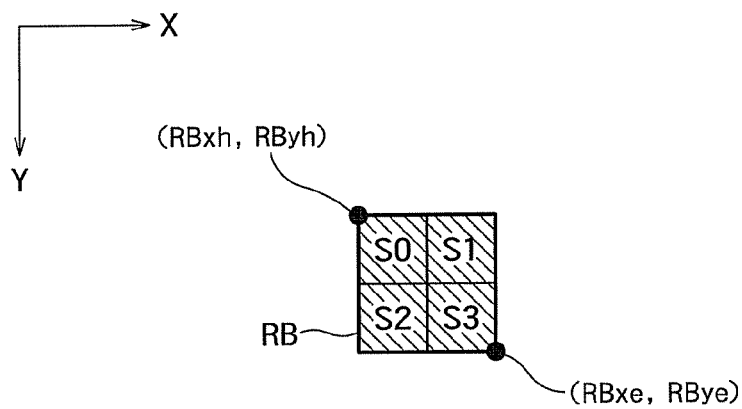
FIGS. 8A and 8B are schematic diagrams of the additional decoding data of the embodiment.
Figure 8B:
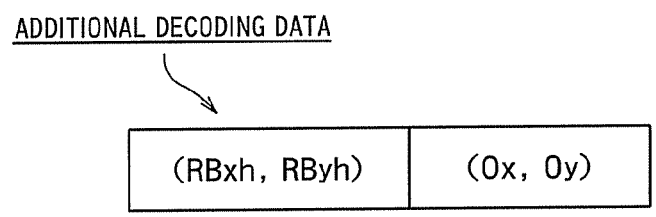

FIGS. 8A and 8B are schematic diagrams of the additional decoding data of the embodiment. The additional decoding data includes a head coordinate (that is, the head coordinate of the sub-block S0) (RBxh, RByh) of the request block RB and an offset value (Ox, Oy) of the request block RB in the space of the image data (see FIGS. 8A and 8B). The offset value (Ox, Oy) is a difference between an end coordinate (that is, the end coordinate of the sub-block S3) (RBxe, RBye) and a head coordinate (RBxh, RByh) of the request block RB (see equation 1).

$$Ox = RBxe - RBxh$$

$$Oy = RBye - RByh \quad \text{(equation 1)}$$

Figure 9:
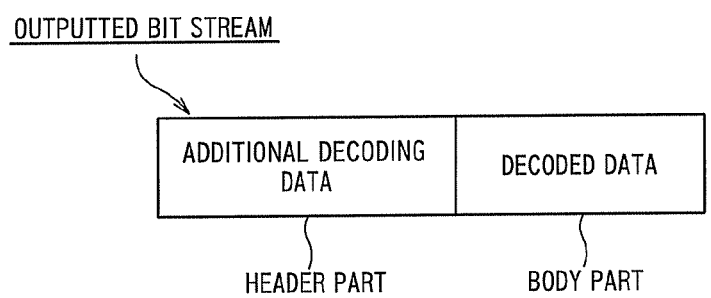
FIG. 9 is a schematic diagram of the outputted bit stream of the embodiment.

<S218> The image processor 18 outputs the outputted bit stream that includes the additional decoding data and the processed image data to the processor 30. FIG. 9 is a schematic diagram of the outputted bit stream of the embodiment. In the outputted bit stream, the additional decoding data is disposed in a header part, and the processed image data is disposed in a body part.

The processor 30 can define the position of the area necessary in the request block RB by referring to the additional decoding data. That is, it is unnecessary that the processor 30 have a function of extracting the position of the necessary area from the request block RB. In other word, since the outputted bit stream includes the additional decoding data, the processed image data can be dealt with even if the processor 30 is a general-purpose processor.

S216 can be omitted. In this case, in S218, the image processor 18 outputs the outputted bit stream that includes the processed image data but does not include the additional decoding data to the processor 30.

A first modification of the embodiment will be described. In the first modification of the embodiment, N (N is an integer of 2 or more) request blocks are selected in S210. The additional decoding data corresponding to the N request blocks is generated in S216.

In code length information on the additional coding data, a starting bit position (however, a head is excluded in a raster sequence) of each sub-block Si is stored as an offset value corresponding to the preceding sub-block in the raster sequence. Based on the code length information, the sub-block selector 16 extracts the bit stream of the necessary sub-block from the bit stream that is read from the memory by the block unit.

Figure 10A:
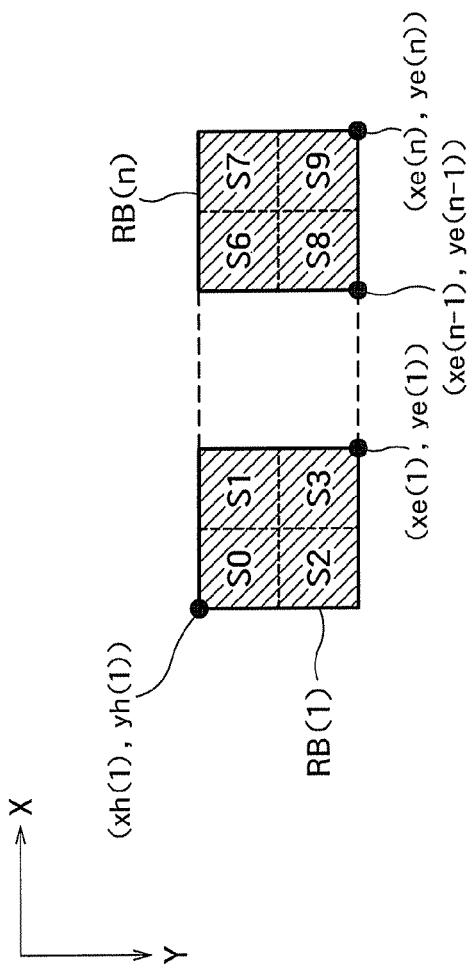
FIGS. 10A and 10B are schematic diagrams illustrating the additional decoding data of the first modification of the embodiment.
Figure 10B:

FIGS. 10A and 10B are schematic diagrams illustrating the additional decoding data of the first modification of the embodiment. The additional decoding data corresponding to the N request blocks includes a head coordinate (xh(1), yh(1)) of a first request block RB(1) and an offset value (Ox(h), Oy(n)) of an n-th (n=2 to N) request block RB(n) in the space of the image data (FIGS. 10A and 10B).

The offset value (Ox(n), Oy(n)) is obtained by adding an offset value (Ox(n−1), Oy(n−1)) to a difference between an end coordinate (xe(n), ye(n)) of the request block RB(n) and an end coordinate (xe(n−1), ye(n−1)) of a request block RB(n−1) (see equation 2). In other words, the offset value (Ox(n), Oy(n)) is the sum of the code lengths of the N request blocks (see equation 3). In the equation 3, CL(n)(x) are code lengths in an X-direction of the request blocks RB(1) to RB(n), and CL(n)(y) are code lengths in a Y-direction of the request blocks RB(1) to RB(n).

$$Ox(n) = Ox(n-1) + \{xe(n) - xe(n-1)\} \quad \text{(equation 2)}$$
$$Oy(n) = Oy(n-1) + \{ye(n) - ye(n-1)\}$$

$$Ox = \sum_{n=1}^{N} CL(n)(x) \quad \text{(equation 3)}$$

$$Oy = \sum_{n=1}^{N} CL(n)(y)$$

$$CL(n)(x) = xe(n) - xh(n)$$
$$CL(n)(y) = ye(n) - yh(n)$$

According to the first modification, since the additional decoding data includes the offset value (Ox(n), Oy(n)), a data amount of the additional decoding data can be reduced compared with the case in which the additional decoding data does not include the offset value (Ox(n), Oy(n)) (that is, the case in which the additional decoding data includes the head coordinates and the end coordinates of all the request blocks RB(n)).

A second modification of the embodiment will be described. In the second modification of the embodiment, in S200, the input bit stream is encoded such that the data amount of the coded data becomes a predetermined coding limit value. The coding limit value is an upper limit or a lower limit of the data amount (hereinafter referred to as a "coding amount") after the coding. The upper limit or the lower limit is defined by the block size, the sub-block size, a coding rate, and an index Si of the sub-block, and the coding limit value. In S216, the additional decoding data is generated based on the coding limit value.

In the code length information on the additional coding data, the starting bit position of each sub-block Si (however, a head is excluded in a raster sequence) is stored as a difference with respect to the upper limit of the coding amount that is applied in encoding the sub-block Si. That is, in the second modification, the sub-block Si is encoded while the sum of coding amounts generated in the sub-blocks S0 to Si is multiplied by an upper limit ULi and a lower limit LLi, and a difference value Di between a coding amount Ci that is actually generated in the sub-blocks S0 to Si at the end of the coding of the sub-block Si and the upper limit ULi is stored as the code length information. Based on the code length information, the sub-block selector 16 extracts the bit stream of the necessary sub-block from the bit stream that is read from the memory by the block unit. Since the coding amount Ci falls between the upper limit ULi and the lower limit LLi, the bit amount necessary to store the difference value Di can be reduced, and the bit amount necessary to store the code length information can be reduced.

FIGS. 11A to 11C are schematic diagrams illustrating the additional decoding data of the second modification of the embodiment. The additional decoding data corresponding to the N request blocks includes the head coordinate (xh(1), yh(1)) and accumulative coding amount AC(x) and coding difference values DC(n) of the request blocks RB(1) to RB(n) in the space of the image data (see FIGS. 11A and 11B). The accumulative coding amount AC(n) is the sum of coding amounts of the request blocks RB(1) to RB(n) (see FIG. 11C). The coding difference value DC(n) is a difference between the accumulative coding amount AC(n) corresponding to the request block RB(n) and a coding limit value SUB(n) corresponding to the request block RB(n).

According to the second modification, the additional decoding data includes the accumulative coding amount AC(n) and the coding difference value DC(n), so that the data amount of the additional decoding data can be reduced compared with the first modification.

According to the embodiment, the image processing is performed on not the block but the sub-block, and the additional decoding data is generated that defines the sub-block. Therefore, when the coded data is read from the memory 20, the utilization efficiency of the bus 11 can be improved without degrading the quality of the data that is obtained by decoding the coded data.

At least a portion of the image processing system 1 according to the above-described embodiments may be composed of hardware or software. When at least a portion of the image processing system 1 is composed of software, a program for executing at least some functions of the image processing system 1 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing system 1 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processing apparatus comprising:
    an encoder configured to encode an input bit stream of image data comprising a plurality of blocks in a block unit in such a manner that data amount of the coded data is equal to a coding limit value and generate coded data;

a sub-block selector configured to select at least one sub-block from the coded data, the sub-block comprising a request area on which an image processing is performed and which is smaller than the block;

a decoder configured to decode the sub-block and generate decoded data;

an image processor configured to perform the image processing on the decoded data and generate processed image data; and an additional data generator configured to generate additional decoding data defining the sub-block corresponding to the decoded data, wherein the additional decoding data comprises a head coordinate of a request block comprising a plurality of sub-blocks and an offset value of the request block, the offset value comprises accumulative coding amount of the first to N-th request blocks, N being an integer more than two, and a coding difference value being a difference between the accumulative coding amount and a coding limit value of each request block.

2. The apparatus of claim 1, wherein the image processor performs the image processing on the decoded data, and generates an outputted bit stream comprising the processed image data and the additional decoded data.

3. The apparatus of claim 1, wherein the coding limit value is a value in accordance with a block size, a sub-block size, and a coding rate.

4. An image processing system comprising:

a memory configured to store image data comprising a plurality of blocks;

an encoder configured to encode an input bit stream of the image data in a block unit in such a manner that data amount of the coded data is equal to a coding limit value and generate coded data;

a memory controller configured to write the coded data into the memory;

a sub-block selector configured to select at least one sub-block from the coded data, the sub-block comprising a request area on which an image processing is performed and which is smaller than the block;

a decoder configured to decode the sub-block and generate decoded data;

an image processor configured to perform the image processing on the decoded data and generate processed image data; and an additional data generator configured to generate additional decoding data defining the sub-block corresponding to the decoded data, wherein the additional decoding data comprises a head coordinate of a request block comprising a plurality of sub-blocks and an offset value of the request block, the offset value comprises accumulative coding amount of the first to N-th request blocks, N being an integer more than two, and a coding difference value being a difference between the accumulative coding amount and a coding limit value of each request block.

5. The apparatus of claim 4, wherein the image processor performs the image processing on the decoded data, and generates an outputted bit stream comprising the processed image data and the additional decoded data.

6. The apparatus of claim 4, wherein the coding limit value is a value in accordance with a block size, a sub-block size, and a coding rate.

7. An image processing apparatus comprising:

an encoder configured to encode an input bit stream of image data comprising a plurality of blocks in a block unit in such a manner that data amount of the coded data is equal to a coding limit value and generate coded data;

a sub-block selector configured to select at least one sub-block from the coded data, the sub-block comprising a request area on which an image processing is performed and which is smaller than the block;

a decoder configured to decode the sub-block and generate decoded data;

an image processor configured to perform the image processing on the decoded data and generate processed image data; and an additional data generator configured to generate additional decoding data defining the sub-block corresponding to the decoded data, wherein the additional decoding data comprises a head coordinate of a request block comprising a plurality of sub-blocks and an offset value of the request block.

8. The apparatus of claim 7, wherein the offset value is a difference between an end coordinate and the head coordinate of the request block.

9. The apparatus of claim 7, wherein the additional decoded data comprises a head coordinate of a first request block and an offset value of an n-th request block, n being two to N, N being an integer more than two, each of the request blocks comprising a plurality of sub-blocks.

10. The apparatus of claim 9, wherein the offset value is a difference between an end coordinate of the n-th request block and the head coordinate of the first request block.

11. The apparatus of claim 9, wherein the offset value is a sum of code lengths of the N request blocks.

* * * * *